(12) United States Patent
Matsuto et al.

(10) Patent No.: US 10,830,320 B2
(45) Date of Patent: *Nov. 10, 2020

(54) ELECTRIC ACTUATOR

(71) Applicant: NTN CORPORATION, Osaka (JP)

(72) Inventors: Takushi Matsuto, Shizuoka (JP); Yoshinori Ikeda, Shizuoka (JP); Yuuki Naitou, Shizuoka (JP)

(73) Assignee: NTN CORPORATION, Osaka (JP)

(*) Notice: Subject to any disclaimer, the term of this patent is extended or adjusted under 35 U.S.C. 154(b) by 63 days.

This patent is subject to a terminal disclaimer.

(21) Appl. No.: 16/071,934

(22) PCT Filed: Dec. 27, 2016

(86) PCT No.: PCT/JP2016/088811
§ 371 (c)(1),
(2) Date: Jul. 23, 2018

(87) PCT Pub. No.: WO2017/130624
PCT Pub. Date: Aug. 3, 2017

(65) Prior Publication Data
US 2019/0040940 A1 Feb. 7, 2019

(30) Foreign Application Priority Data
Jan. 27, 2016 (JP) ................... 2016-013522

(51) Int. Cl.
*F16H 25/22* (2006.01)
*H02K 7/06* (2006.01)
(Continued)

(52) U.S. Cl.
CPC ..... *F16H 25/2228* (2013.01); *F16H 25/2015* (2013.01); *F16H 25/2204* (2013.01);
(Continued)

(58) Field of Classification Search
None
See application file for complete search history.

(56) References Cited

U.S. PATENT DOCUMENTS 4,987,788 A * 1/1991 Bausch .............. B60G 7/003
180/412
5,931,268 A * 8/1999 Kingston .......... F16D 65/0006
188/158
(Continued)

FOREIGN PATENT DOCUMENTS

DE 20 2014 103 629 10/2014
EP 1 189 331 3/2002
(Continued)

OTHER PUBLICATIONS

International Search Report dated Mar. 21, 2017 in International (PCT) Application No. PCT/JP2016/088811.
(Continued)

*Primary Examiner* — Dirk Wright
(74) *Attorney, Agent, or Firm* — Wenderoth, Lind & Ponack, L.L.P.

(57) ABSTRACT

Provided is an electric actuator, including: a motor part; a motion conversion mechanism part; an operation part; and a terminal part, wherein a hollow rotary shaft configured to support a rotor core of the motor part is supported by a rolling bearing so as to be rotatable, wherein the motion conversion mechanism part is coupled to the hollow rotary shaft, and includes a ball screw, wherein a ball screw nut of the ball screw is arranged inside the hollow rotary shaft, wherein the operation part is coupled to the motion conversion mechanism part, and wherein an inner raceway surface of the rolling bearing is formed on the hollow rotary shaft.

9 Claims, 12 Drawing Sheets

(51) Int. Cl.
  H02K 7/116 (2006.01)
  F16H 25/20 (2006.01)
  F16H 57/021 (2012.01)
  *F16D 121/24* (2012.01)
  *F16D 125/40* (2012.01)

(52) U.S. Cl.
  CPC ............. F16H 57/021 (2013.01); H02K 7/06 (2013.01); H02K 7/116 (2013.01); *F16D 2121/24* (2013.01); *F16D 2125/40* (2013.01); *F16H 25/2214* (2013.01); *F16H 2025/2075* (2013.01); *F16H 2025/2078* (2013.01)

(56) References Cited

U.S. PATENT DOCUMENTS

| | | | | |
|---|---|---|---|---|
| 6,230,854 | B1* | 5/2001 | Schwarz | F16D 65/18 188/156 |
| 6,367,592 | B1 | 4/2002 | Kapaan et al. | |
| 6,367,597 | B1* | 4/2002 | De Vries | B60T 13/74 188/196 V |
| 6,907,967 | B1* | 6/2005 | Kapaan | F16D 65/18 188/156 |
| 8,235,165 | B2* | 8/2012 | Birkwald | B62D 5/0448 180/444 |
| 9,954,416 | B2* | 4/2018 | Kataoka | H02K 7/06 |
| 2015/0015104 | A1 | 1/2015 | Kataoka et al. | |
| 2019/0040939 | A1* | 2/2019 | Matsuto | G01D 5/145 |
| 2019/0044409 | A1* | 2/2019 | Matsuto | F16C 19/545 |
| 2019/0072163 | A1* | 3/2019 | Matsuto | F16C 19/16 |
| 2019/0085957 | A1* | 3/2019 | Matsuto | F16H 25/20 |
| 2019/0097492 | A1* | 3/2019 | Matsuto | F16H 1/28 |

FOREIGN PATENT DOCUMENTS

| | | |
|---|---|---|
| JP | 2002-510020 | 4/2002 |
| JP | 2010-242949 | 10/2010 |
| JP | 2011-132335 | 7/2011 |
| JP | 2014-018007 | 1/2014 |
| JP | 2015-194262 | 11/2015 |
| WO | 01/63730 | 8/2001 |

OTHER PUBLICATIONS

Extended European Search Report dated Jul. 25, 2019 in corresponding European Patent Application No. 16888208.2.
International Preliminary Report on Patentability dated Jul. 31, 2018 in International (PCT) Application No. PCT/JP2016/088811.

* cited by examiner

ELECTRIC ACTUATOR

TECHNICAL FIELD

The present invention relates to an electric actuator.

BACKGROUND ART

In recent years, in order to attain power saving and reduction in fuel consumption of a vehicle or the like, motorization has been promoted. For example, a system of performing operations of an automatic transmission, a brake, and a steering wheel of an automobile using power of an electric motor has been developed, and brought into market. As an actuator used for such applications, there has been known an actuator using a ball screw mechanism in order to convert rotary motion of the electric motor into motion in a linear direction (Patent Document 1).

PRIOR ART DOCUMENTS

Patent Documents

Patent Document 1: JP 2014-18007 A

SUMMARY OF THE INVENTION

Problems to be Solved by the Invention

In Patent Document 1, there is proposed an electric actuator in which a nut of the ball screw and a rotor of the electric motor are integrated so that the rotor of the electric motor has a function of the nut of the ball screw and a part of the rotor serves as an inner ring of a rolling bearing configured to support the rotor. In a case in which the electric actuator is used for a vehicle such as an automobile, in order to meet a demand to reduce the mass and cost to the extent possible, it is desired that the number of components be reduced to the extent possible. Further, in the case in which the rotor (nut of the ball screw) and the inner ring of the rolling bearing are integrated, functions that are required for respective materials are in common between the inner ring of the rolling bearing and the nut of the ball screw, and hence the same material can be used.

However, it is found that, in consideration of standardization of the nut of the ball screw for production of various types of linear-motion actuators in series with standardized components, an effect of the integration of the rotor and the nut of the ball screw is small.

Further, when rotation of the motor is balanced, a radial load to be borne by the rolling bearing configured to support a rotor core is as small as own weight of the rotor core. Thus, it is found that the rolling bearing does not require use of a material having a high strength, and inexpensive mild steel is sufficient. Further, heat treatment is not required, or high-temperature tempering (thermal refining) is sufficient.

In view of the above-mentioned problems, the present invention has an object to provide an electric actuator, which is suitable for reduction in size, enhancement in mountability, reduction in cost, and production in series.

Solution to the Problems

As a result of various studies conducted to achieve the above-mentioned object, the inventors of the present invention have conceived of such a novel idea of forming an inner ring of a rolling bearing integrally with a rotor inner being a hollow rotary shaft configured to support a rotor core of a motor part of an electric actuator.

According to one embodiment of the present invention, as technical means for achieving the above-mentioned object, there is provided an electric actuator, comprising: a motor part; a motion conversion mechanism part; an operation part; and a terminal part, wherein a hollow rotary shaft configured to support a rotor core of the motor part is supported by a rolling bearing so as to be rotatable, wherein the motion conversion mechanism part is coupled to the hollow rotary shaft, and comprises a ball screw, wherein a ball screw nut of the ball screw is arranged inside the hollow rotary shaft, wherein the operation part is coupled to the motion conversion mechanism part, and wherein an inner raceway surface of the rolling bearing is formed on the hollow rotary shaft. With the above-mentioned configuration, an electric actuator which is suitable for reduction in size, enhancement in mountability, reduction in cost, and production in series can be achieved.

It is desired that the above-mentioned rolling bearing having the inner raceway surface comprise a ball bearing. With this configuration, the rotation characteristic of the hollow rotary shaft is excellent, and the configuration is advantageous in reduction in cost.

It is desired that the above-mentioned motion conversion mechanism part comprise a speed reducer configured to reduce speed of rotation of the ball screw nut. With this configuration, a small-sized motor can be employed, thereby being capable of attaining reduction in size and enhancement in mountability of the electric actuator.

It is desired that the above-mentioned speed reducer comprise a planetary gear speed reducer. In this case, a multi-layer structure of the hollow rotary shaft, the planetary gear carrier, and the ball screw nut in a radial direction can be achieved, thereby being capable of attaining further reduction in size and enhancement in mountability of the electric actuator.

When the above-mentioned inner raceway surface of the rolling bearing is arranged on an inner side of an axial width of the ball screw nut, the electric actuator can be reduced in size and enhanced in mountability.

When both ends of the above-mentioned hollow rotary shaft are supported by a plurality of rolling bearings, and a thrust bearing is arranged within a range in an axial direction between the plurality of rolling bearings, such configuration is advantageous in receiving a moment load, and the thrust bearing can be reduced in size.

When the above-mentioned thrust bearing is arranged at a position close to a center portion of axial positions of the plurality of rolling bearings, such configuration is extremely advantageous in receiving the moment load, and reduction in size of the thrust bearing can further be promoted.

When the above-mentioned thrust bearing comprises a thrust needle roller bearing, a large thrust load can be supported in a small mounting space.

When the above-mentioned terminal part is sandwiched in the axial direction by the casing of the electric actuator, there can be provided an electric actuator in which a plurality of casings configured to accommodate the motor part are stacked in a longitudinal direction so that a plurality of operation parts are provided.

Effects of the Invention

According to the present invention, the electric actuator which is suitable for reduction in size, enhancement in mountability, reduction in cost, and production in series can be achieved.

EMBODIMENTS OF THE INVENTION

An electric actuator according to one embodiment of the present invention is described with reference to FIG. 1 to FIG. 12.

Figure 1:
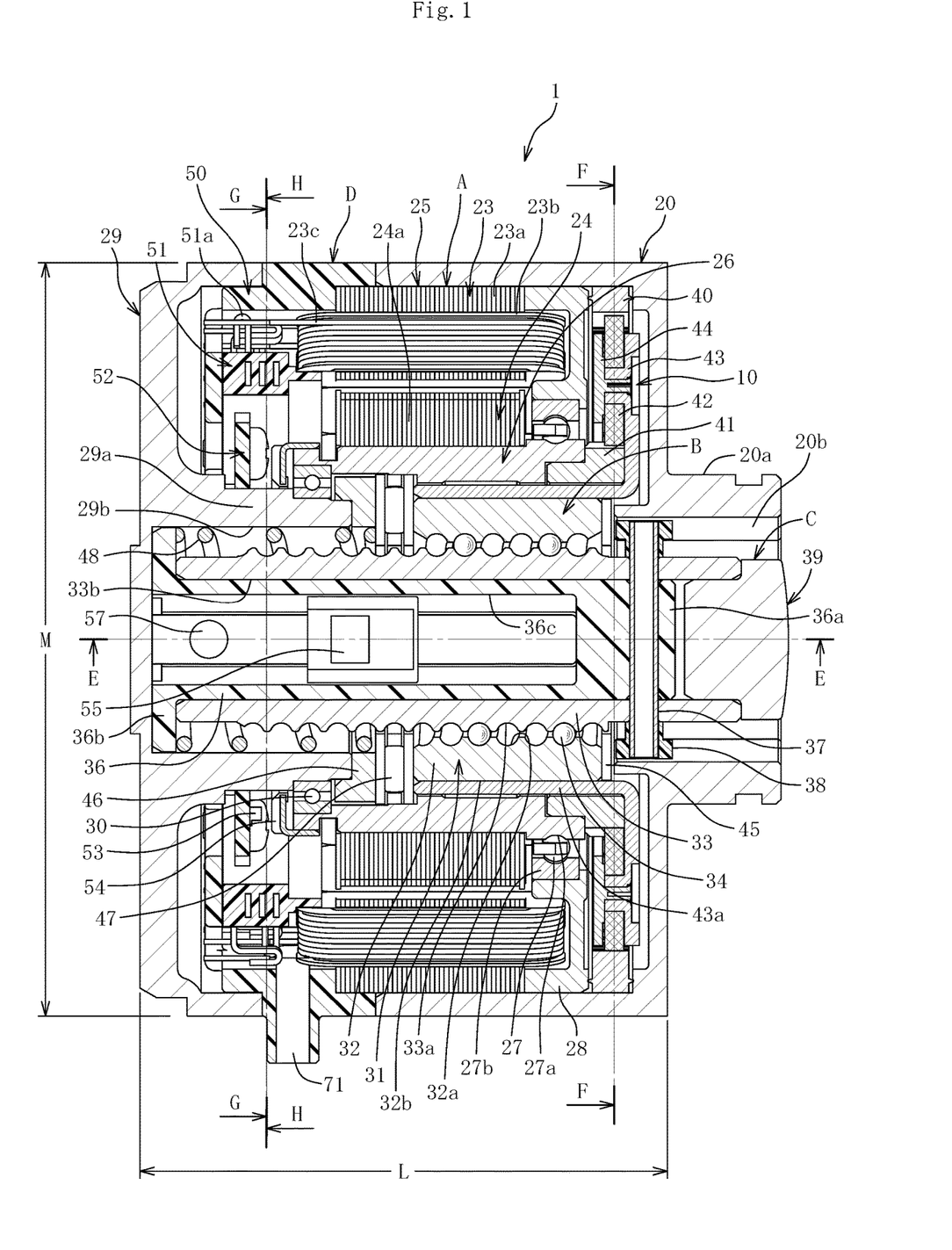
FIG. 1 is a vertical sectional view of an electric actuator according to one embodiment of the present invention.
Figure 2:
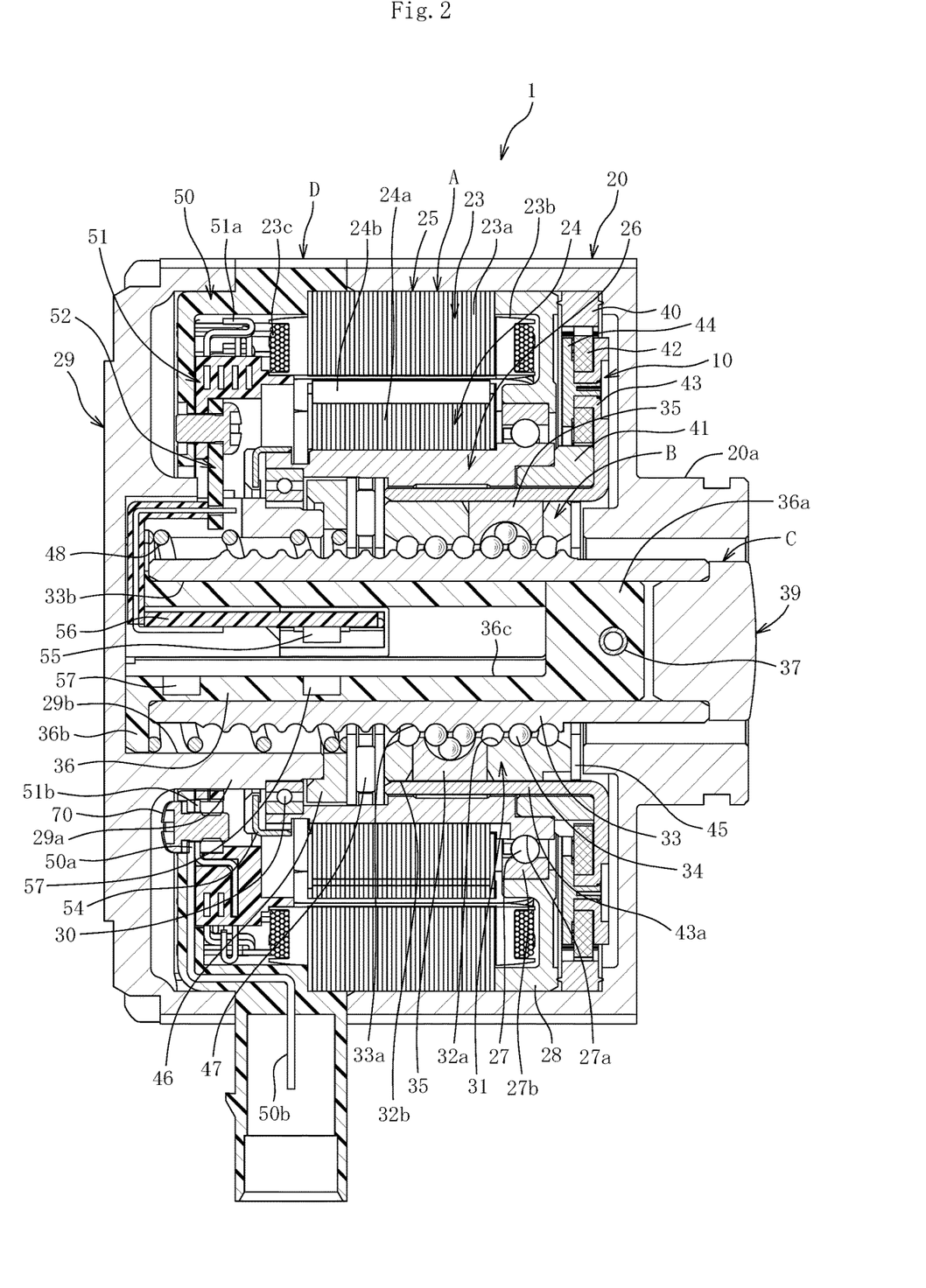
FIG. 2 is a vertical sectional view as viewed from a direction indicated by the arrows of the line E-E of FIG. 1.

FIG. 1 is a vertical sectional view for illustrating an assembled state of the electric actuator according to this embodiment, and FIG. 2 is a vertical sectional view as viewed from a direction indicated by the arrows of the line E-E of FIG. 1. As illustrated in FIG. 1 and FIG. 2, the electric actuator 1 mainly comprises a motor part A for generating a driving force, a motion conversion mechanism part B for converting rotation of the motor part A and outputting the resultant, an operation part C for outputting the motion of the motion conversion mechanism part B, and a terminal part D comprising a power supply circuit and a sensor.

The motor part A and a planetary gear speed reducer 10 being a part of the motion conversion mechanism part B are accommodated in a casing 20. The motor part A is formed of a radial gap motor 25. The radial gap motor 25 comprises a stator 23 and a rotor 24. The stator 23 is fixed to the casing 20. The rotor 24 is arranged so as to be opposed to a radially inner side of the stator 23 with a gap. The stator 23 is constructed by mounting a bobbin 23b to a stator core 23a for insulation and winding coils 23c around the bobbin 23b. The rotor 24 comprises a rotor core 24a and a permanent magnet 24b (see FIG. 2). The permanent magnet 24b is mounted to an outer periphery of the rotor core 24a. The rotor 24 is externally fitted to the rotor inner 26 being a hollow rotary shaft to be mounted and fixed.

The rotor inner 26 has, on an outer periphery at one end portion (on a right side of FIG. 1 and FIG. 2) thereof, an inner raceway surface 27a of a rolling bearing 27. An outer ring 27b of the rolling bearing 27 is mounted to a bearing holder 28 fitted to an inner peripheral surface of the casing 20. A rolling bearing 30 is mounted between an inner peripheral surface at another end portion of the rotor inner 26 (on a left side of FIG. 1 and FIG. 2) and an outer peripheral surface of a cylindrical portion 29a of a cover 29. With this, the rotor inner 26 is supported at both end portions thereof by the rolling bearings 27 and 30 so as to be rotatable.

The motion conversion mechanism part B comprises a ball screw 31 and the planetary gear speed reducer 10. The ball screw 31 mainly comprises a ball screw nut 32, a ball screw shaft 33, a large number of balls 34, and frames 35 (see FIG. 2) being circulation members. A spiral groove 32a is formed in an inner peripheral surface of the ball screw nut 32, and a spiral groove 33a is formed in an outer peripheral surface of the ball screw shaft 33. The balls 34 are loaded between both the spiral grooves 32a and 33a, and the two frames 35 are incorporated. With this, two rows of the balls 34 are circulated.

The ball screw shaft 33 has a hollow hole 33b, and a spring mounting collar 36 is accommodated in the hollow hole 33b. The spring mounting collar 36 is made of a resin material such as PPS, and has a circular solid portion 36a at one end portion thereof (on the right side of FIG. 1), and a spring receiving portion 36b having a flange shape at another end portion thereof (on the left side of FIG. 1). Further, the spring mounting collar 36 has a recessed portion 36c extending from an inner end of the circular solid portion 36a to the another end portion.

The spring mounting collar 36 is inserted into the hollow hole 33b of the ball screw shaft 33, and a pin 37 is fitted in a radial direction so as to pass through the ball screw shaft 33 and the circular solid portion 36a of the spring mounting collar 36, to thereby couple and fix the ball screw shaft 33 and the spring mounting collar 36 to each other. Guide collars 38 are externally fitted to both end portions of the pin 37, which protrude from the outer peripheral surface of the ball screw shaft 33, so as to be rotatable. The guide collars 38 are each made of a resin material such as PPS, and are fitted into guide grooves 20b formed in an inner periphery of a cylindrical portion 20a of the casing 20 so that the ball screw shaft 33 is stopped in rotation. With this, when the ball screw nut 32 is rotated, the ball screw shaft 33 reciprocates in a right-and-left direction of FIG. 1 and FIG. 2. An actuator head 39 being the operation part C is mounted to one end portion of the ball screw shaft 33 (on the right side of FIG. 1).

Figure 3:
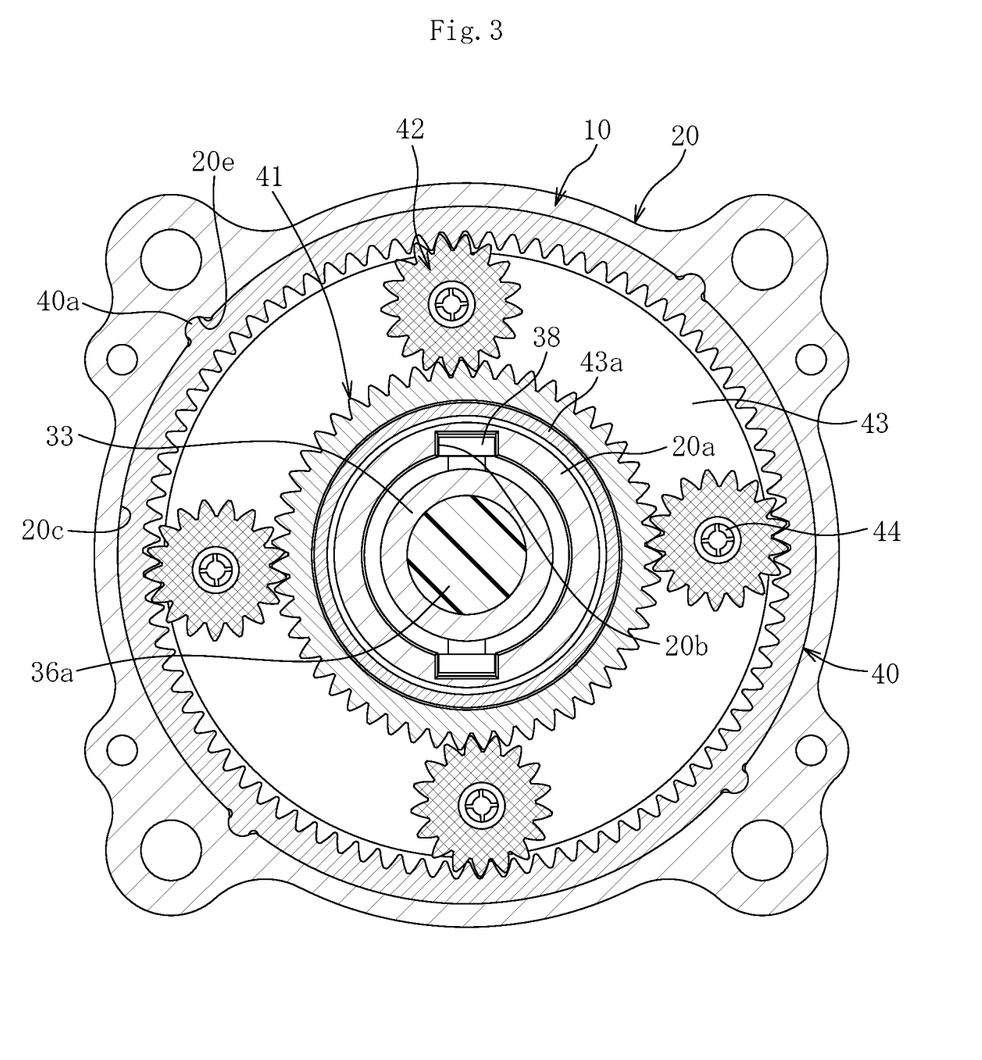
FIG. 3 is a transverse sectional view as viewed from a direction indicated by the arrows of the line F-F of FIG. 1.
Figure 4:
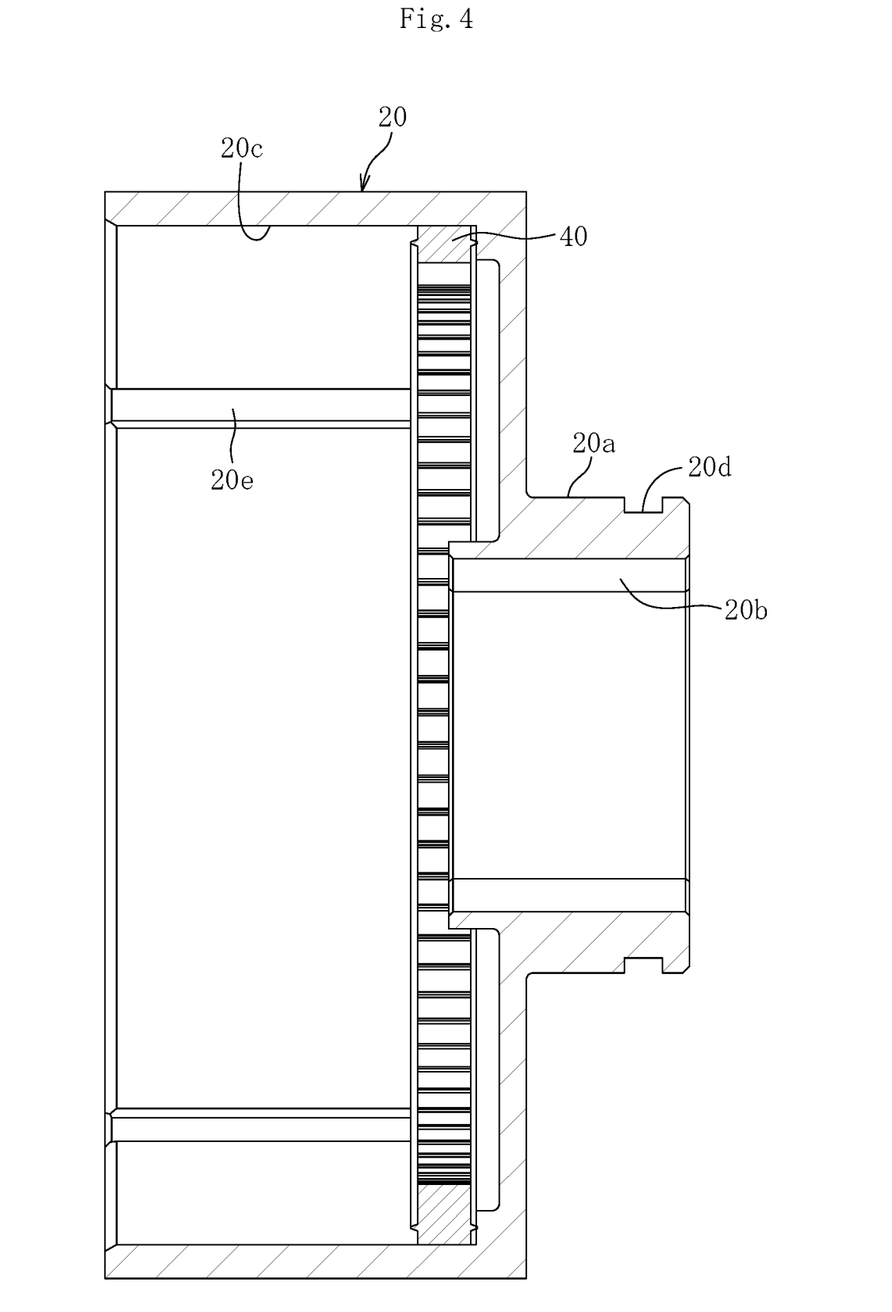
FIG. 4 is a vertical sectional view for illustrating a state in which a ring gear is incorporated in a casing.

The planetary gear speed reducer 10 is described with reference to FIG. 1, FIG. 3, and FIG. 4. FIG. 3 is a transverse sectional view as viewed from a direction indicated by the arrows of the line F-F of FIG. 1. The planetary gear speed reducer 10 comprises a ring gear 40, a sun gear 41, a planetary gear 42, a planetary gear carrier 43, and a planetary gear holder 44. As illustrated in FIG. 3, the planetary gear 42 is meshed between the ring gear 40 and the sun gear 41. A plurality of (for example, four) notches 40a are formed on an outer periphery of the ring gear 40, and axial grooves 20e as many as the number of the notches 40a are formed in an inner peripheral surface 20c of the casing 20. The notches 40a of the ring gear 40 are incorporated in the axial grooves 20e of the casing 20 so as to align phases thereof. With this, the ring gear 40 is stopped in rotation with respect to the casing 20. As illustrated in FIG. 4, a fitting groove 20d for an O-ring is formed in an outer peripheral surface of the cylindrical portion 20a of the casing 20, and the guide grooves 20b for the guide collars 38 (see FIG. 1) are formed in an inner peripheral surface thereof.

As illustrated in FIG. 1, the sun gear 41 is press-fitted to a step-portion inner peripheral surface of the rotor inner 26, and is coupled thereto so as to allow torque transmission therebetween. The planetary gear 42 is supported to the planetary gear carrier 43 and the planetary gear holder 44 so as to be rotatable. A cylindrical portion 43a of the planetary gear carrier 43 is press-fitted to an outer peripheral surface of the ball screw nut 32, and is coupled thereto so as to allow torque transmission therebetween. An outer peripheral surface of the cylindrical portion 43a of the planetary gear carrier 43 and an inner peripheral surface of the rotor inner 26 are fitted to each other with a guide clearance therebetween so that the rotor inner 26 and the planetary gear carrier 43 are rotatable relative to each other. With the planetary gear speed reducer 10, the speed of rotation of the rotor inner 26 of the motor 25 is reduced, and the rotation is transmitted to the ball screw nut 32. With this, rotational torque is increased, thereby being capable of reducing the size of the motor 25.

In this embodiment, the electric actuator 1 comprising the planetary gear speed reducer 10 is exemplified, but the present invention is not limited thereto. There can also be provided an electric actuator having a structure in which the rotor inner 26 directly transmits torque to the ball screw nut 32 without providing the planetary gear speed reducer.

As illustrated in FIG. 1, a thrust washer 45 is mounted between one end surface of the ball screw nut 32 (on the right side of FIG. 1) and an inner end surface of the cylindrical portion 20a of the casing 20. A thrust receiving ring 46 is mounted to a distal end portion of the cylindrical portion 29a of the cover 29, and a thrust needle roller bearing 47 being a thrust bearing is mounted between another end surface of the ball screw nut 32 (on the left side of FIG. 1) and the thrust receiving ring 46. With the thrust needle roller bearing 47, a thrust load generated when the ball screw nut 32 is rotated so that the ball screw shaft 33 advances to the right side of the drawings can smoothly be supported. Through the employment of the thrust needle roller bearing 47, the thrust load can be supported in a small mounting space. Further, the thrust needle roller bearing 47 is arranged within a range in an axial direction between the rolling bearings 27 and 30 configured to support both the ends of the rotor inner 26, and hence is advantageous in receiving a moment load. In particular, when the thrust needle roller bearing 47 is arranged at a position close to the center portion of the axial positions of the rolling bearings 27 and 30 configured to support both the ends of the rotor inner 26 as in this embodiment, the thrust needle roller bearing 47 is extremely advantageous in receiving the moment load.

A compression coil spring 48 is accommodated in a recessed portion 29b in the inner periphery of the cylindrical portion 29a of the cover 29, and both ends of the compression coil spring 48 are held in abutment against the thrust needle roller bearing 47 and the spring receiving portion 36b of the spring mounting collar 36, respectively. With a spring force of the compression coil spring 48, the ball screw shaft 33 coupled to the spring mounting collar 36 is constantly urged in a direction toward an initial position.

Figure 9:
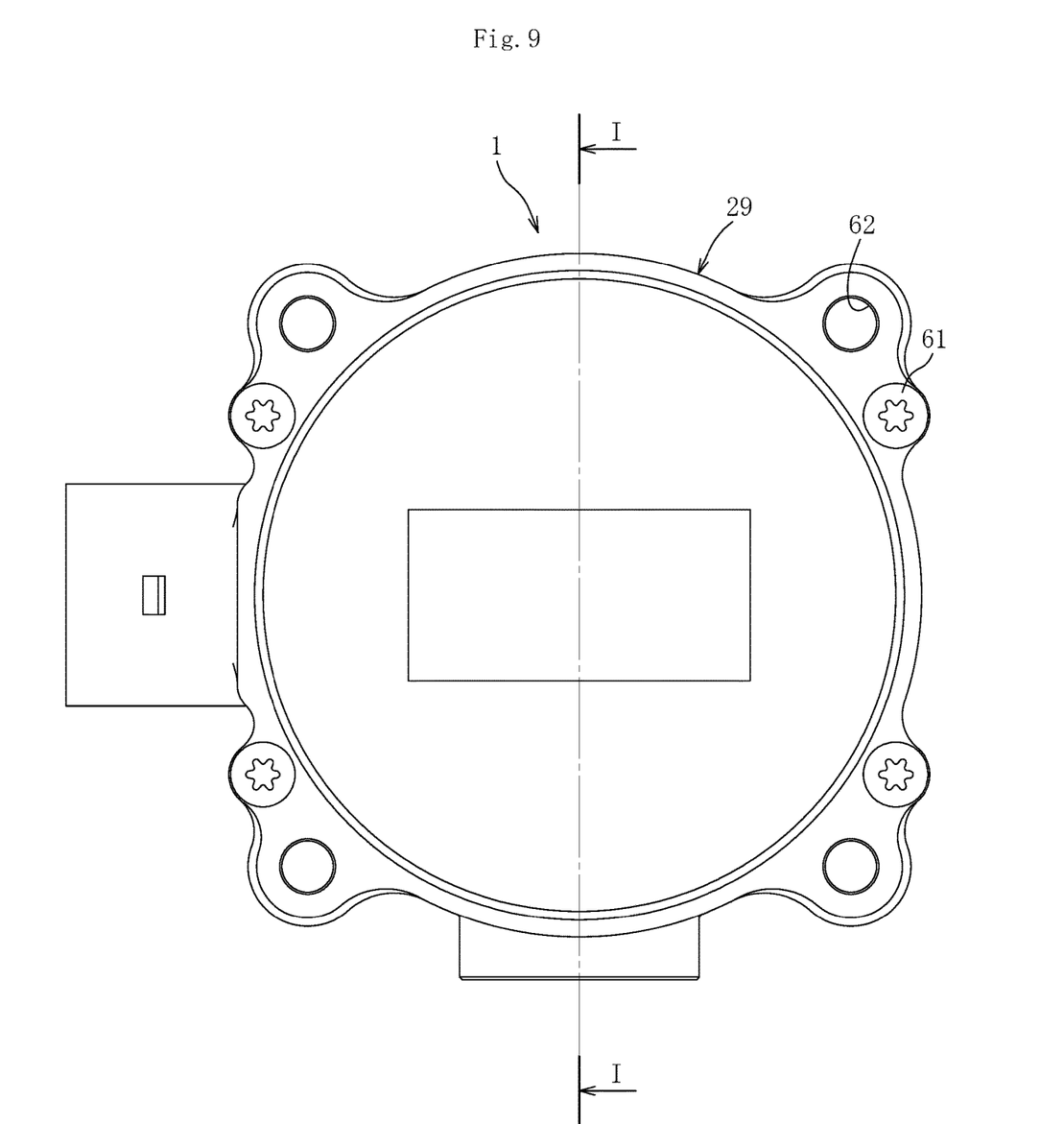
FIG. 9 is a left side view of the electric actuator of FIG. 1.
Figure 10:
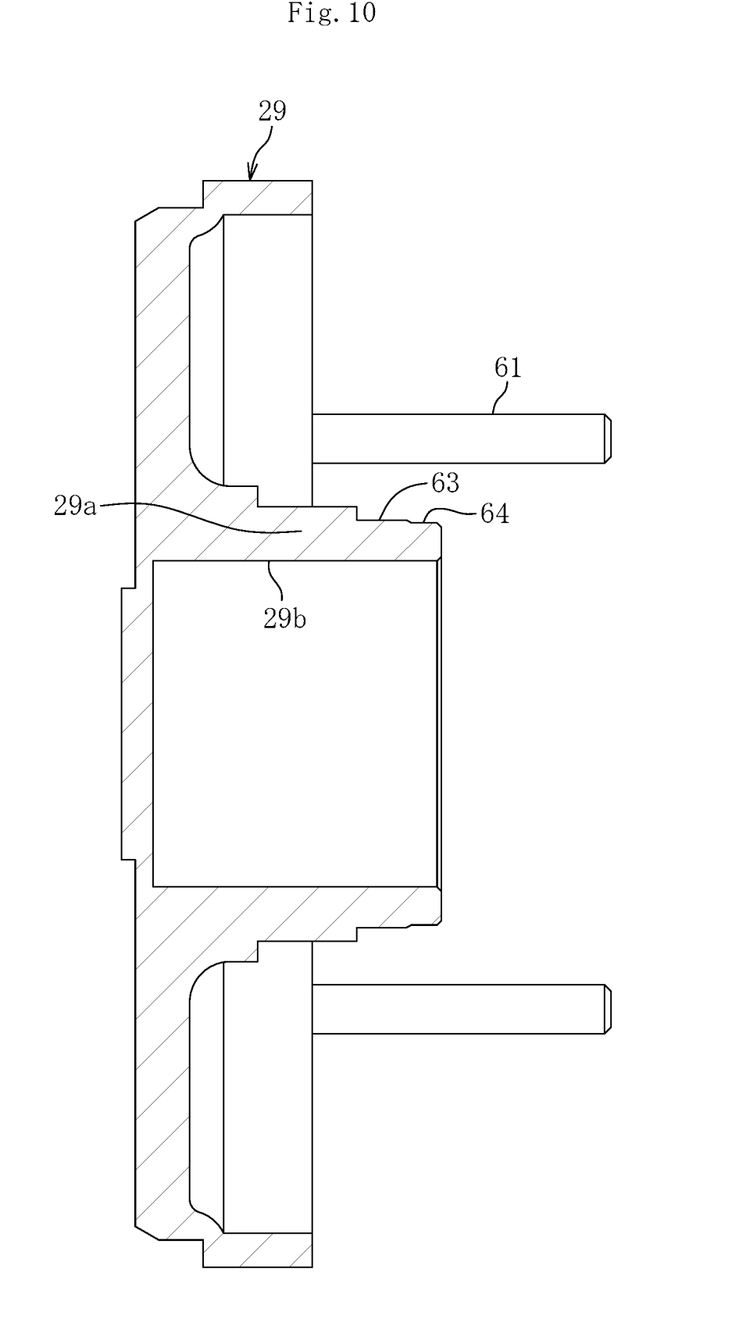
FIG. 10 is a vertical sectional view of a cover as viewed from a direction indicated by the arrows of the line I-I of FIG. 9.

The cover 29 is described in detail with reference to FIG. 9 and FIG. 10. FIG. 9 is a left side view of FIG. 1, and FIG. 10 is a vertical sectional view of the cover 29 as viewed from a direction indicated by the arrows of the line I-I of FIG. 9. The cover 29 is made of, for example, aluminum, a zinc alloy, or a magnesium alloy. In a periphery of a radially outer side of the cover 29, there are formed through holes (not shown) for inserting bolts 61 for assembling and fastening the electric actuator 1, and through holes 62 for mounting the electric actuator 1 thus assembled to an installation position.

As illustrated in FIG. 10, on an outer peripheral surface of a distal end portion of the cylindrical portion 29a of the cover 29, a bearing mounting surface 63 and a fitting surface 64 for the thrust receiving ring 46 are formed, and, in an inner periphery of the cylindrical portion 29a, a recessed portion 29b for accommodating the compression coil spring 48 (see FIG. 1) is formed.

Figure 5:
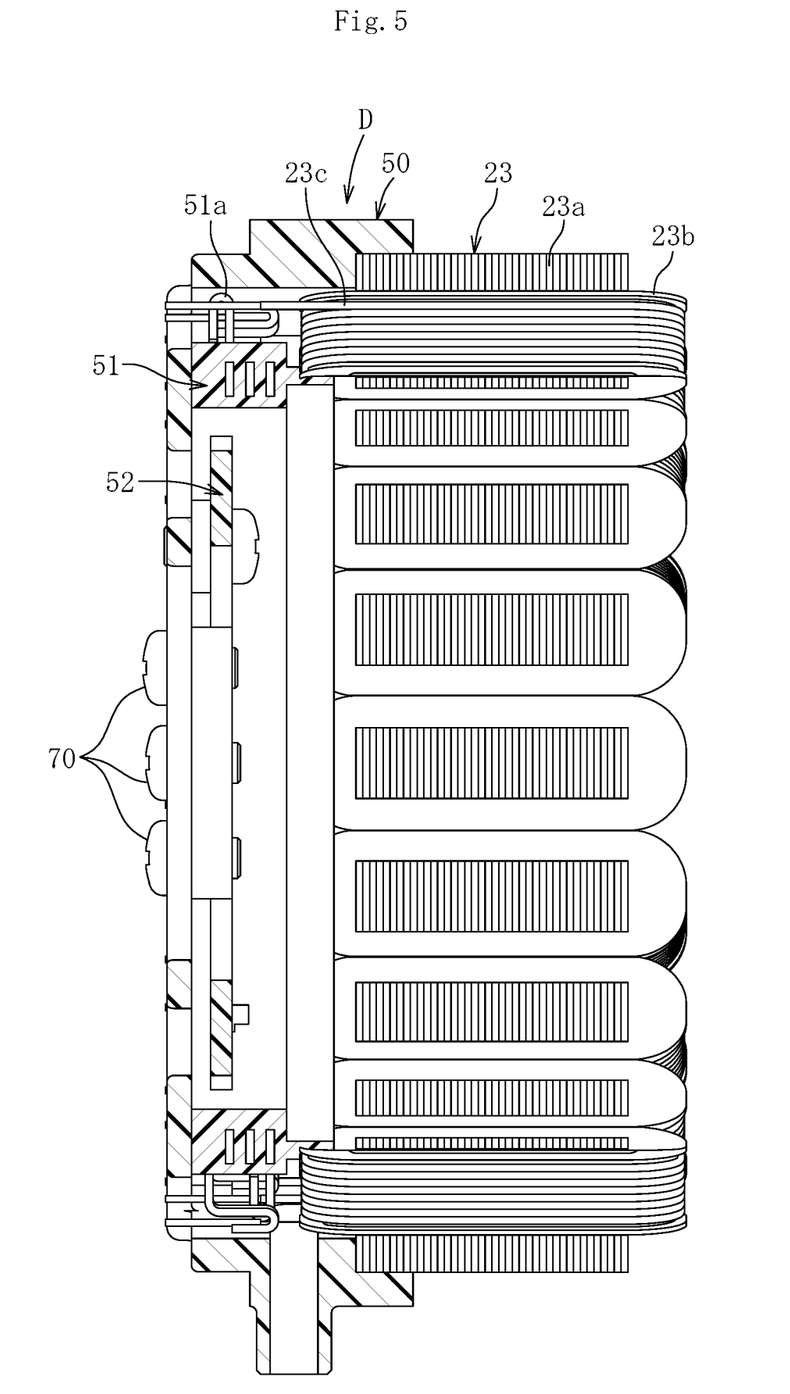
FIG. 5 is an enlarged vertical sectional view of a stator of a motor and a terminal part extracted from FIG. 1.
Figure 6:
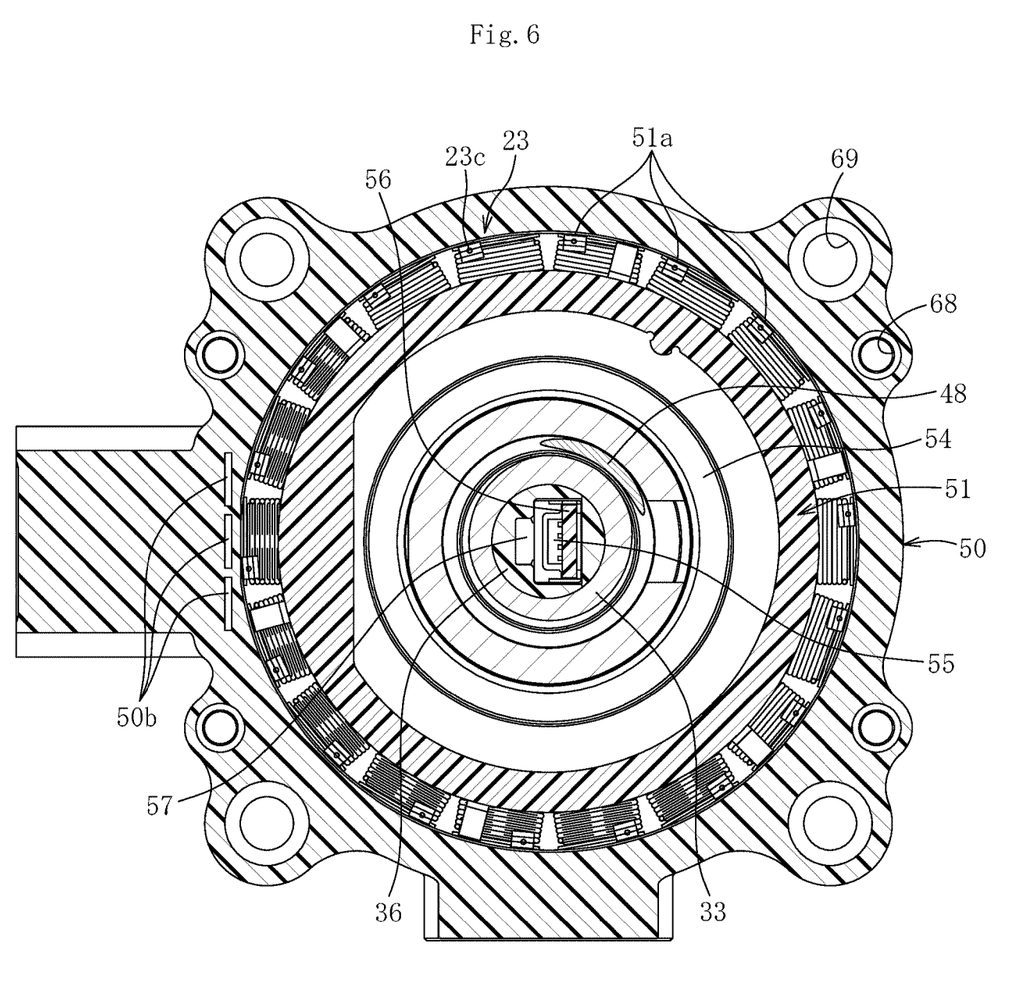
FIG. 6 is a transverse sectional view as viewed from a direction indicated by the arrows of the line G-G of FIG. 1.
Figure 7:
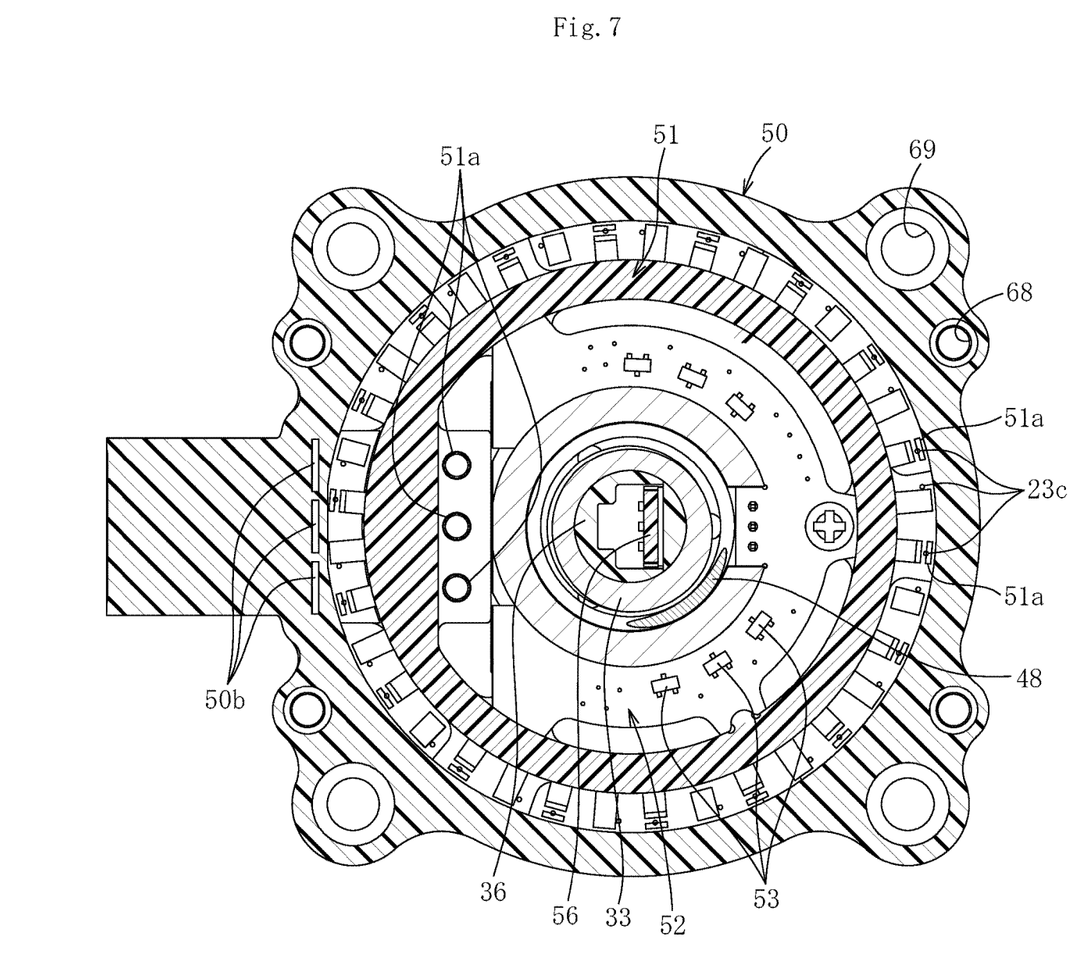
FIG. 7 is a transverse sectional view as viewed from a direction indicated by the arrows of the line H-H of FIG. 1.

Next, the terminal part D is described with reference to FIG. 1, FIG. 2, and FIG. 5 to FIG. 7. FIG. 5 is an enlarged view of the stator 23 of the motor 25 and the terminal part D extracted from FIG. 1. FIG. 6 is a transverse sectional view as viewed from a direction indicated by the arrows of the line G-G of FIG. 1, and FIG. 7 is a transverse sectional view as viewed from a direction indicated by the arrows of the line H-H of FIG. 1. As illustrated in FIG. 5, the terminal part D comprises a terminal main body 50, a bus bar 51 accommodated in an inside of the terminal main body 50, and a printed board 52. The bus bar 51 and the printed board 52 are retained to the terminal main body 50 with screws. As illustrated in FIG. 6 and FIG. 7, the coils 23c of the stator 23 are temporarily connected to terminals 51a of the bus bar 51 separately for phases of U, V, and W. Further, as illustrated in FIG. 2, terminals 51b of the bus bar 51 and a terminal block 50a of the terminal main body 50 are fastened and connected to each other with screws 70. Terminals 50b that extend from the terminal block 50a of the terminal main body 50 are connected to a controller (see FIG. 11 and FIG. 12). The terminals 50b are each a terminal for a power supply source. A signal line is connected by a connector 71 of FIG. 1. As illustrated in FIG. 6 and FIG. 7, in a periphery of a radially outer side of the terminal main body 50, there are formed through holes 68 for assembling and fastening, and through holes 69 for mounting.

Two types of sensors are mounted in the electric actuator 1 according to this embodiment. Those sensors are described with reference to FIG. 1, FIG. 2, FIG. 6, and FIG. 7. One of those types is rotation angle detection sensors 53 used for controlling rotation of the motor 25. As the rotation angle detection sensors 53, Hall elements are suitable. As illustrated in FIG. 1 and FIG. 7, the rotation angle detection sensors 53 are mounted to the printed board 52. As illustrated in FIG. 1, a pulsar ring 54 is mounted to another end portion of the rotor inner 26 of the motor 25 (on the left side of FIG. 1), and is arranged so as to be opposed to the rotation angle detection sensors 53 with a gap in an axial direction under a state in which the electric actuator 1 is assembled. The rotation angle detection sensors 53 sequentially determine timings of causing a current to flow through three phases of U, V, and W.

The other of those types of the sensors is a stroke detection sensor 55 used for controlling a stroke of the ball screw shaft 33. The stroke detection sensor 55 is also mounted to the printed board 52. As illustrated in FIG. 2, FIG. 6, and FIG. 7, a band-like printed board 56 extending in the axial direction is connected to the printed board 52, and the stroke detection sensor 55 is mounted to the printed board 56. The printed board 56 and the stroke detection sensor 55 are arranged in the recessed portion 36c of the spring mounting collar 36 accommodated in the hollow hole 33b of the ball screw shaft 33. The permanent magnet 57 as a target is mounted to the inner periphery of the recessed portion 36c of the spring mounting collar 36, and is arranged so as to be opposed to the stroke detection sensor 55 with an interval in the radial direction. With this, a signal for controlling the stroke of the ball screw shaft 33 can be extracted.

In this embodiment, the electric actuator 1 using the stroke detection sensor 55 is exemplified. However, the stroke detection sensor 55 may not be used depending on application.

Figure 8:
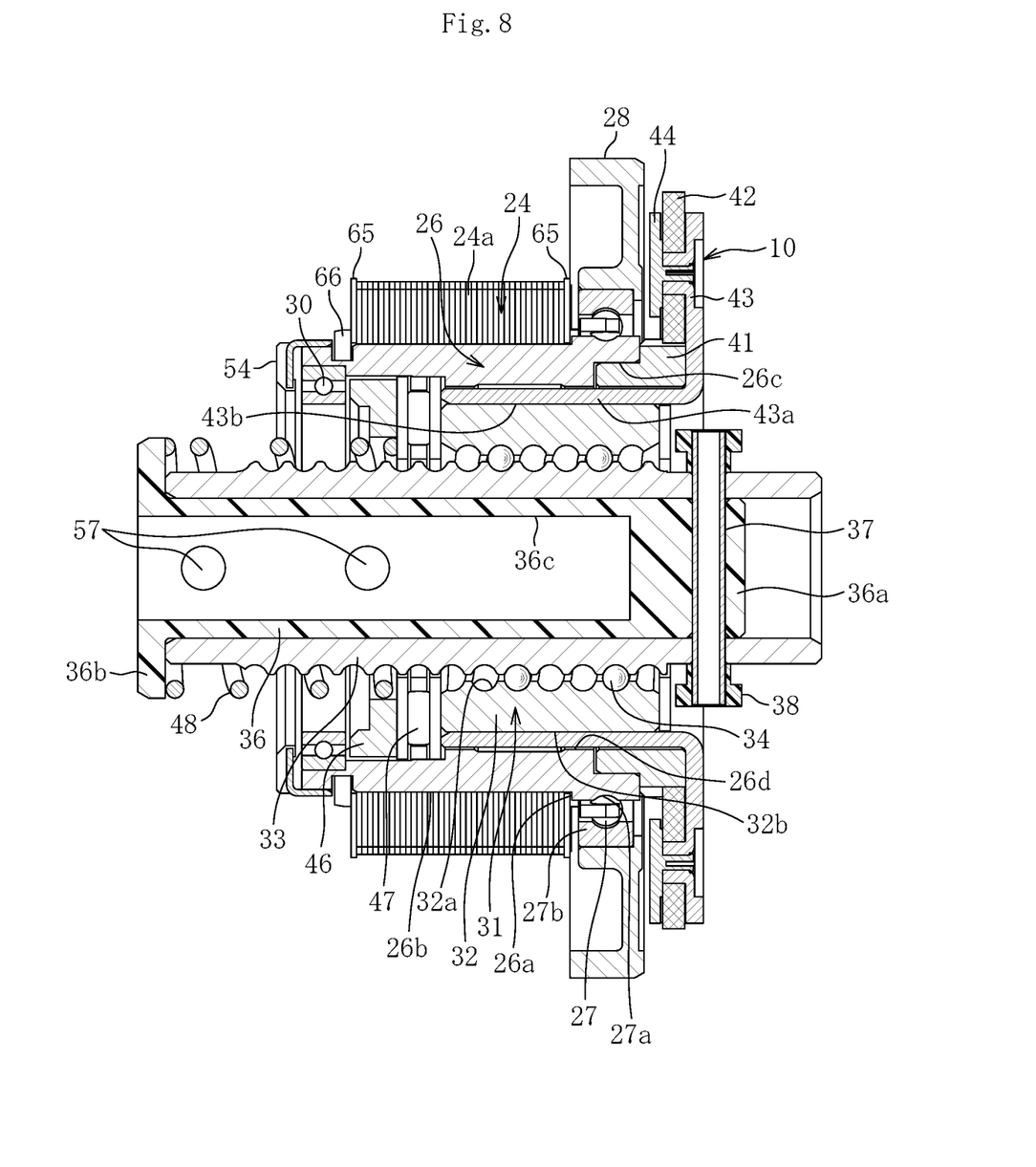
FIG. 8 is a vertical sectional view of a rotor assembly of a motor part and a motion conversion mechanism part extracted from FIG. 1.

The overall configuration of the electric actuator 1 according to this embodiment is as described above. Next, a characteristic configuration of the electric actuator 1 according to this embodiment, which is suitable for reduction in size, enhancement in mountability, reduction in cost, and production in series, is described with reference to FIG. 1 and FIG. 8 in a collective manner. FIG. 8 is a vertical sectional view of a rotor assembly of the motor part A and the motion conversion mechanism part B extracted from FIG. 1.

A side plate 65 is set to one shoulder portion 26*a* of the rotor inner 26 being the hollow rotary shaft, and the rotor core 24*a* is fitted to an outer peripheral surface 26*b* of the rotor inner 26. Under this state, the permanent magnet (see FIG. 2) is inserted into the rotor core 24*a*, and the remaining part of the end surface of the rotor core 24*a* is positioned and fixed by a circlip 66 through intermediation of the side plate 65.

In the rotor inner 26, the inner raceway surface 27*a* of the rolling bearing 27 is formed at an axial position of one end portion (on the right side of FIG. 8), which is close to one end portion of the rotor core 24*a*, and a rolling bearing 30 is mounted at an axial position of the inner peripheral surface at another end portion (on the left side of FIG. 8), which is close to another end portion of the rotor core 24*a*. With this structure, the rotor inner 26 can be reduced in size in the axial direction. In addition, also with the structure in which the rolling bearing 27 is arranged on the inner side of the axial width of the ball screw nut 32, an axial dimension L of the casing of the electric actuator 1 illustrated in FIG. 1 can be reduced so that the electric actuator 1 can be reduced in size and enhanced in mountability.

The support bearings 27 and 30 for the rotor inner 26 to which the rotor core 24*a* is mounted only need to support a radial load as small as own weight of the rotor because rotation of the rotor is balanced. The rolling bearing 27 does not require use of a material having a high strength, and inexpensive mild steel that is a material of the rotor inner 26 is sufficient. Further, quenching as heat treatment is not required. In particular, in the electric actuator 1 according to this embodiment, the planetary gear speed reducer 10 is used. Thus, a radial load is not generated. Further, a reaction force of liner motion is supported by the dedicated thrust needle roller bearing 47 having a high load capacity. Therefore, the rolling bearing 27 only needs to have a function of positioning in the radial direction, and the material specifications as described above are sufficient. With this, reduction in cost can be attained.

Further, the thrust needle roller bearing 47 is arranged within the range in the axial direction between the rolling bearings 27 and 30 configured to support both the ends of the rotor inner 26, and hence is advantageous in receiving the moment load, thereby being capable of reducing the size of the thrust bearing. In particular, when the thrust needle roller bearing 47 is arranged at the position close to the center portion of the axial positions of the rolling bearings 27 and 30 configured to support both the ends of the rotor inner 26 as in this embodiment, the thrust needle roller bearing 47 is extremely advantageous in receiving the moment load, thereby being capable of further promoting reduction in size of the thrust bearing. As a result, the thrust needle roller bearing 47 and the thrust receiving ring 46 can be reduced in size, thereby contributing to reduction in size of the entire electric actuator 1.

When the speed reducer (planetary gear speed reducer 10) is provided, rotational torque can be increased in accordance with a speed reduction ratio. Thus, a small-sized motor can be employed. In addition, in this embodiment, the cylindrical portion 43*a* of the planetary gear carrier 43 is provided as an output portion of the speed reducer, and is press-fitted to the outer peripheral surface of the ball screw nut 32 so as to be coupled thereto. Thus, workability in coupling at the time of assembly is also excellent. A guide clearance is secured between the outer peripheral surface of the cylindrical portion 43*a* of the planetary gear carrier 43 and an inner peripheral surface 26*d* of the rotor inner 26 so that the planetary gear carrier 43 is supported so as to be rotatable. Further, in addition to the employment of the small-sized motor, with a multi-layer structure in the radial direction of the rotor inner 26, the cylindrical portion 43*a* of the planetary gear carrier 43, and the ball screw nut 32, a radial dimension M of the casing of the electric actuator 1 can be reduced, thereby attaining reduction in size and enhancement in mountability.

An inner peripheral surface 43*b* of the cylindrical portion 43*a* of the planetary gear carrier 43, which is the output portion of the planetary gear speed reducer 10, is press-fitted to an outer peripheral surface 32*b* of the ball screw nut 32, and is coupled thereto so as to allow torque transmission therebetween. The fitting area between the inner peripheral surface 43*b* and the outer peripheral surface 32*b* can sufficiently be secured, and thus stable torque transmission is enabled in a case of high torque after reduction in speed. Further, with a mode in which the rotor inner 26 and the ball screw nut 32 are provided as separated structures, and the outer peripheral surface 32*b* of the ball screw nut 32 is press-fitted as the coupling structure to the ball screw nut 32, even in a case of a combination of a ball screw having a different lead and the rotor inner 26, the ball screw and the rotor inner 26 can easily be combined.

The sun gear 41 of the planetary gear speed reducer 10 is press-fitted to an inner peripheral surface 26*c* at one end portion of the rotor inner 26 (on the right side of FIG. 8), and is coupled thereto so as to allow torque transmission therebetween. The coupling structure obtained by press-fitting is a portion of involving high-speed rotation before reduction in speed of the rotor inner 26 (for example, about 2,000 $\text{min}^{-1}$ to about 3,000 $\text{min}^{-1}$). Thus, the coupling structure is sufficient as a torque transmitting surface, and is also excellent in workability in coupling at the time of assembly. Further, the coupling structure is located immediately below the rolling bearing 27 configured to support the rotor inner 26, and hence rotation accuracy of the sun gear 41 is also excellent.

The terminal main body 50 is sandwiched between the casing 20 and the cover 29, and the terminal portion is formed in the radial direction. There may also be provided an electric actuator in which a plurality of casings 20 configured to accommodate the motor A are stacked in a longitudinal direction so that the plurality of operation parts C are provided.

Further, in the electric actuator 1 according to this embodiment, for example, the motor part A may be standardized, and the ball screw portion may be changed. In this manner, there can be provided an electric actuator used for various applications and adapted to various specifications, and the electric actuator is suitable for production of the electric actuator 1 in series.

With the characteristic configuration as described above, the electric actuator 1 according to this embodiment can attain a linear-motion actuator that is suitable for reduction in size, enhancement in mountability, reduction in cost, and production in series.

Figure 11:
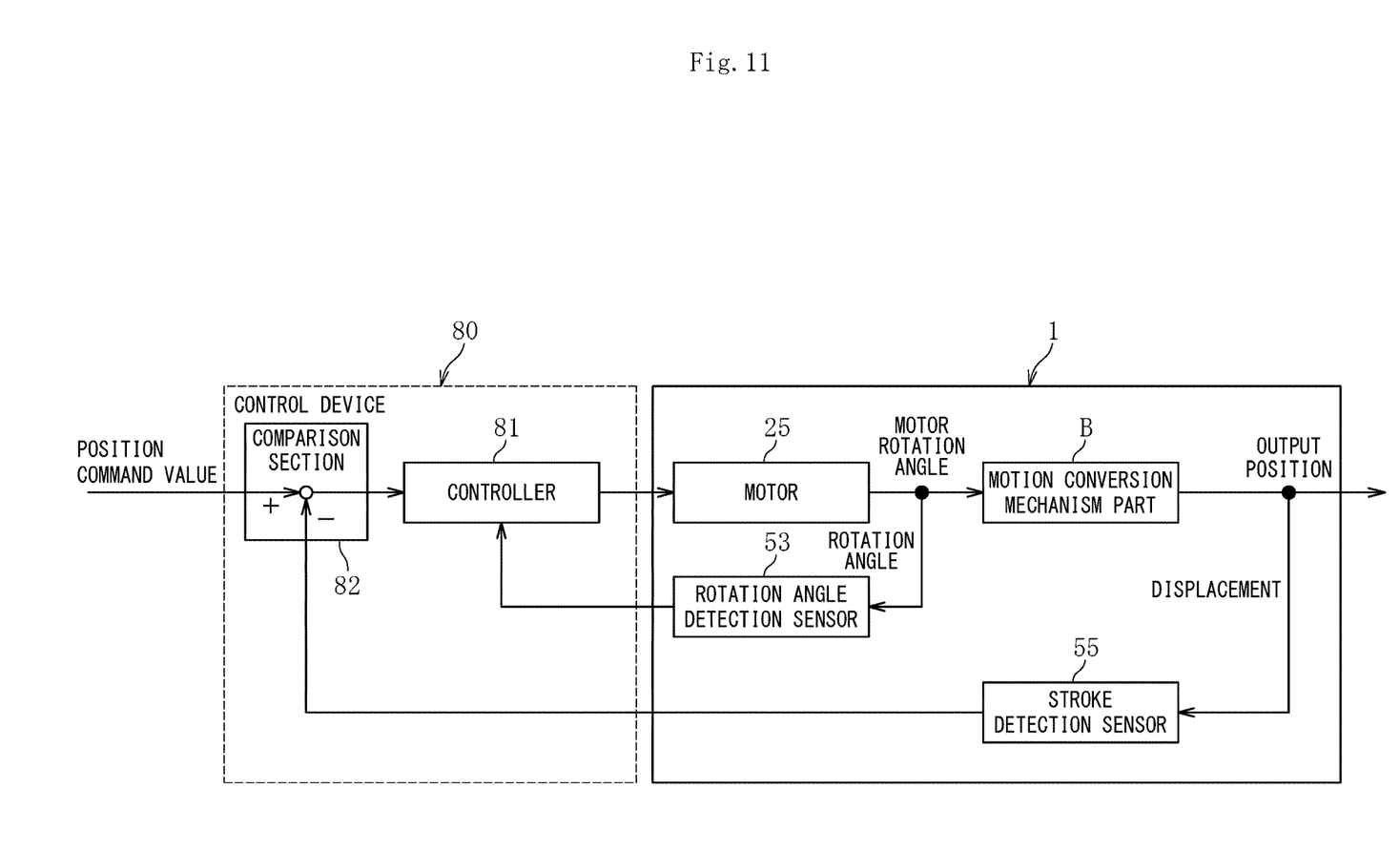
FIG. 11 is a control block diagram of the electric actuator.

Next, an operation of the electric actuator 1 according to this embodiment is described with reference to FIG. 1 and FIG. 11. Although not illustrated, for example, an operation amount is input to an ECU at an upper part of a vehicle. Based on the operation amount, the ECU computes a position command value to be required. As illustrated in FIG. 11, the position command value is sent to a controller 81 of the control device 80, the controller 81 computes a control signal of a motor rotation angle required for the position command value, and the control signal is sent from the controller 81 to the motor 25.

The rotor inner 26 being the hollow rotary shaft of the motor 25 having received the control signal is rotated, and the rotation is transmitted to the motion conversion mechanism part B. Specifically, the sun gear 41 of the planetary gear speed reducer 10 coupled to the rotor inner 26 is rotated, and the planetary gear 42 is revolved. Through the revolving motion, the rotation speed of the planetary gear carrier 43 is reduced to be lower than the rotation speed of the rotor inner 26, thereby increasing the rotational torque.

The ball screw nut 32 coupled to the planetary gear carrier 43 is rotated, and the ball screw shaft 33 that is stopped in rotation advances to the right side of FIG. 1 and advances up to the position based on the control signal from the controller 81. Then, the actuator head 39 mounted to the one end portion of the ball screw shaft 33 (on the right side of FIG. 1) operates a device to be controlled (not shown).

Regarding the position of the ball screw shaft 33, as illustrated in FIG. 11, a detection value detected by the stroke detection sensor 55 is sent to a comparison section 82 of the control device 80, and a difference between the detection value and a position command value is calculated. Then, a control signal is sent from the controller 81 to the motor 25 based on the calculated value and the signal from the rotation angle detection sensors 53 so that the position of the actuator head 39 is subjected to feedback control. Therefore, when the electric actuator 1 according to this embodiment is adopted to, for example, a shift-by-wire system, a shift position can reliably be controlled. Power from a power source is input from an external portion such as a battery provided on the vehicle side to the control device 80 (not shown), and is used for drive of the motor or the respective sensors.

Figure 12:
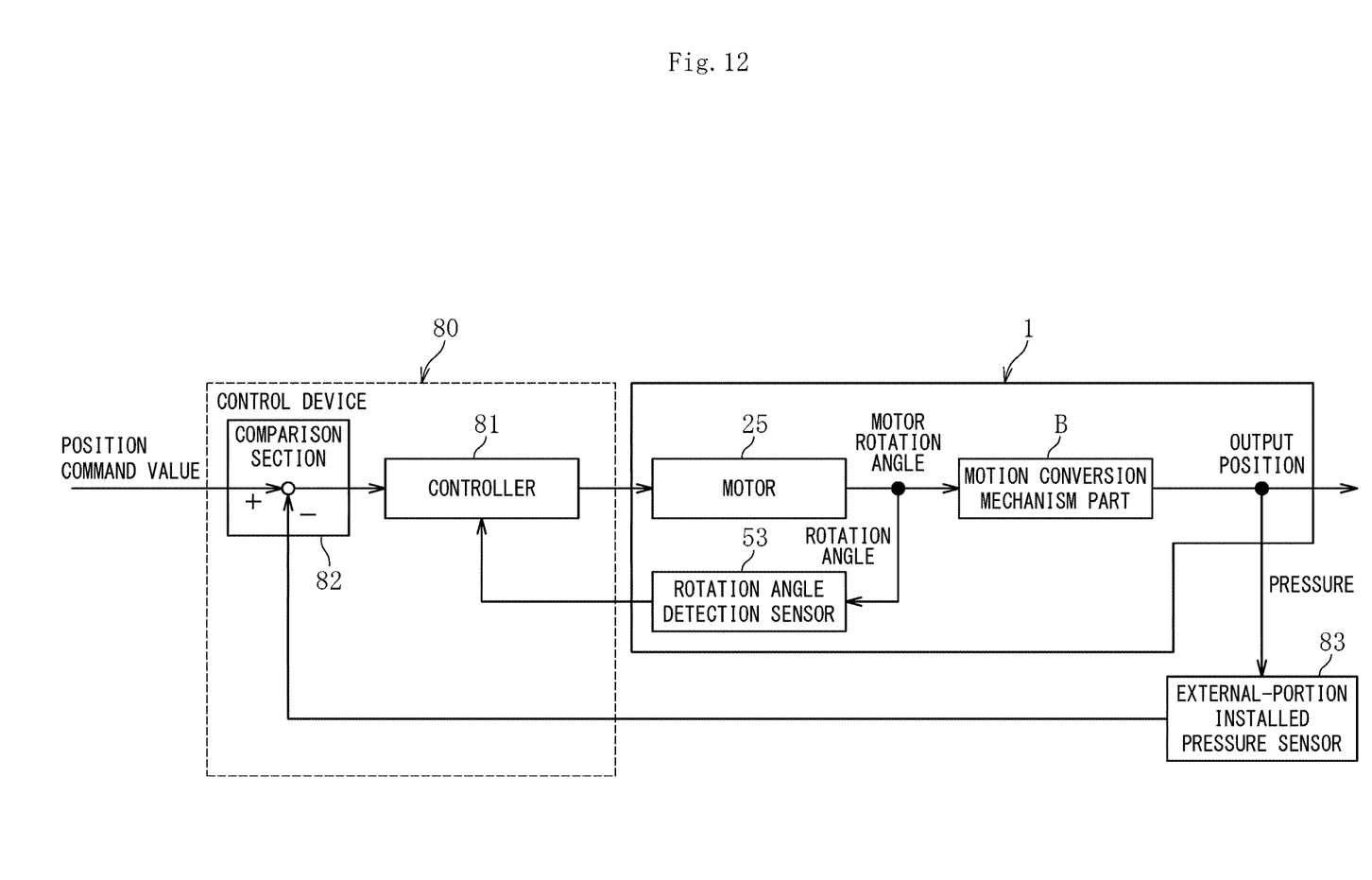
FIG. 12 is a control block diagram of the electric actuator.

FIG. 12 is a control block diagram in a case in which the stroke detection sensor 55 is not used. In this case, as an example of pressure control, a pressure sensor 83 is provided in the device to be controlled (not shown). When the operation amount is input to the ECU at the upper part of the vehicle, the ECU computes a pressure command value to be required. The pressure command value is sent to the controller 81 of the control device 80, the controller 81 computes a current value of the motor, which is required for the pressure command value, and the current value is sent from the controller 81 to the motor 25. Similarly to the case of FIG. 11, the ball screw shaft 33 advances to the right side of FIG. 1. The actuator head 39 mounted to the one end portion of the ball screw shaft 33 operates to increase the pressure of the device to be controlled (not shown).

The operating pressure of the actuator head 39 is detected by the external-portion installed pressure sensor 83, and is subjected to feedback control. Therefore, when the electric actuator 1 is adopted to, for example, a brake-by-wire system, a hydraulic pressure of the brake can reliably be controlled.

Finally, an overview of an assembly process of the electric actuator 1 according to this embodiment is described. First, as illustrated in FIG. 4, the ring gear 40 is inserted into the casing 20. At the time of the insertion, as illustrated in FIG. 3, phase alignment is performed on the notches 40a of the ring gear 40 and the axial grooves 20e of the casing 20.

Subsequently, the subassembly illustrated in FIG. 8, which is obtained by assembling the rotor assembly of the motor part A and the motion conversion mechanism B, is inserted into the casing 20 illustrated in FIG. 4. At the time of the insertion, meshing of the planetary gear 42 and the ring gear 40, phase alignment of the guide collars 38 and the guide grooves 20b, and a fitting operation for the bearing holder 28 and the inner peripheral surface 20c of the casing 20 are performed.

After that, the assembly of the stator 23 and the terminal main body 50 illustrated in FIG. 5 is inserted into the casing 20. At the time of the insertion, phase alignment is performed on projecting portions (not shown) formed on the stator 23 and the axial grooves 20e of the casing 20.

Finally, the cover 29 is set, and is fastened with the bolts 61. With this, the assembly of the electric actuator 1 is completed.

In the embodiment described above, the case in which the planetary gear mechanism is used as the speed reducer is exemplified. However, the present invention is not limited thereto, and a speed reducer comprising another mechanism may be used.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 electric actuator
10 planetary gear speed reducer
20 casing
23 stator
23a stator core
23b bobbin
23c coil
24 rotor
24a rotor core
24b permanent magnet
25 motor
26 rotor inner (hollow rotary shaft)
27 rolling bearing
27a inner raceway surface
27b outer ring
28 bearing holder
29 cover
30 rolling bearing
31 ball screw
32 ball screw nut
32a spiral groove
32b ball screw nut outer peripheral surface
33 ball screw shaft 33a spiral groove
34 ball
35 frame
36 spring mounting collar
37 pin
38 guide collar
39 actuator head
40 ring gear
41 sun gear
42 planetary gear
43 planetary gear carrier
43a cylindrical portion
44 planetary gear holder
47 thrust needle roller bearing
48 compression coil spring
50 terminal main body
51 bus bar
52 printed board
53 rotation angle detection sensor
54 pulsar ring
55 stroke detection sensor
56 printed board
57 permanent magnet
A motor part
B motion conversion mechanism part
C operation part
D terminal part
L axial dimension of casing
M radial dimension of casing

The invention claimed is:

1. An electric actuator, comprising:
a motor part;
a motion conversion mechanism part;
an operation part; and
a terminal part,
wherein a hollow rotary shaft, as a rotor inner, configured to support a rotor core of the motor part is supported by a rolling bearing so as to be rotatable,
wherein the motion conversion mechanism part is coupled to the hollow rotary shaft to allow torque transmission therebetween, the motion conversion mechanism part comprising a ball screw including a ball screw nut,
wherein the ball screw is arranged inside the hollow rotary shaft,
wherein the operation part is coupled to the motion conversion mechanism part,
wherein the hollow rotary shaft and the ball screw nut of the ball screw are separate members, the ball screw nut and the hollow rotary shaft overlap in a radial direction, and the ball screw nut is arranged inside the hollow rotary shaft,
wherein an inner raceway surface of the rolling bearing is formed on an outer periphery of the hollow rotary shaft by one end of the rotor core, and the inner raceway surface is arranged within an axial width of the ball screw nut, and
wherein a thrust bearing for supporting a reaction force of liner motion is disposed at one end of the ball screw nut.

2. The electric actuator according to claim 1, wherein the rolling bearing having the inner raceway surface comprises a ball bearing.

3. The electric actuator according to claim 1, wherein the motion conversion mechanism part further comprises a speed reducer configured to reduce a speed of rotation of the ball screw nut.

4. The electric actuator according to claim 3, wherein the speed reducer comprises a planetary gear speed reducer.

5. The electric actuator according to claim 1, wherein the inner raceway surface of the rolling bearing is arranged on an inner side of the axial width of the ball screw nut.

6. The electric actuator according to claim 1,
wherein both ends of the hollow rotary shaft are supported by a plurality of rolling bearings, and
wherein a thrust bearing is arranged within a range in an axial direction between the plurality of rolling bearings.

7. The electric actuator according to claim 6, wherein the thrust bearing is arranged at a position close to a center portion of axial positions of the plurality of rolling bearings.

8. The electric actuator according to claim 6, wherein the thrust bearing comprises a thrust needle roller bearing.

9. The electric actuator according to claim 1, wherein the terminal part is sandwiched in an axial direction by a casing of the electric actuator.

* * * * *